United States Patent
Mo et al.

(10) Patent No.: US 9,697,345 B2
(45) Date of Patent: Jul. 4, 2017

(54) ELECTRONIC APPARATUS WITH FINGERPRINT SENSING FUNCTION, DRIVING CIRCUIT, AND METHOD FOR DRIVING ELECTRONIC APPARATUS WITH FINGERPRINT SENSING FUNCTION

(71) Applicant: FocalTech Systems, Ltd., George Town, Grand Cayman (KY)

(72) Inventors: Lianghua Mo, Guangdong (CN); Zhi Liu, Guangdong (CN); Jie Liu, Guangdong (CN)

(73) Assignee: FOCALTECH ELECTRONICS, LTD., Grand Cayman (KY)

( * ) Notice: Subject to any disclaimer, the term of this patent is extended or adjusted under 35 U.S.C. 154(b) by 203 days.

(21) Appl. No.: 14/586,041

(22) Filed: Dec. 30, 2014

(65) Prior Publication Data

US 2015/0324625 A1 Nov. 12, 2015

(30) Foreign Application Priority Data

May 9, 2014 (CN) .......................... 2014 1 0196102

(51) Int. Cl.
*G06K 9/00* (2006.01)
*G06F 21/32* (2013.01)
(Continued)

(52) U.S. Cl.
CPC ............ *G06F 21/32* (2013.01); *G06F 3/0488* (2013.01); *G06K 9/00013* (2013.01); *G06K 9/209* (2013.01)

(58) Field of Classification Search
None
See application file for complete search history.

(56) References Cited

U.S. PATENT DOCUMENTS 6,100,811 A * 8/2000 Hsu .................... B60H 1/00642
340/426.36
2008/0088552 A1* 4/2008 Toya .................... G09G 3/3688
345/84

(Continued)

FOREIGN PATENT DOCUMENTS

CN 102135800 7/2011
TW 2012-34282 8/2012

(Continued)

OTHER PUBLICATIONS

103145359, Aug. 21, 2015, Taiwanese Office Action and Partial English Translation.

(Continued)

*Primary Examiner* — Delomia L Gilliard
(74) *Attorney, Agent, or Firm* — Workman Nydegger (57) ABSTRACT

An electronic apparatus with fingerprint sensing function, a driving circuit, and a method for driving the electronic apparatus are provided. The electronic apparatus includes: a first fingerprint sensor adapted to perform fingerprint sensing; a second fingerprint sensor adapted to perform fingerprint sensing; and a driving circuit. The driving circuit provides a first fingerprint detection signal to the first fingerprint sensor for performing fingerprint detection, and determines whether to control the electronic apparatus to perform a first function, based on fingerprint detection information from the first fingerprint sensor; and provides a second fingerprint detection signal to the second fingerprint sensor for performing fingerprint detection, and determines whether to control the electronic apparatus to perform a second function, based on fingerprint detection information from the second fingerprint sensor. With above technical solution, security for usage of the electronic apparatus is improved.

23 Claims, 5 Drawing Sheets

(51) Int. Cl.
    *G06K 9/20*       (2006.01)
    *G06F 3/0488*    (2013.01)

(56) References Cited

U.S. PATENT DOCUMENTS

| | | |
|---|---|---|
| 2009/0083847 A1 | 3/2009 | Fadell et al. |
| 2010/0267424 A1* | 10/2010 | Kim ................. G06F 3/016 |
| | | 455/566 |
| 2012/0044156 A1* | 2/2012 | Michaelis ........... G06F 3/03547 |
| | | 345/173 |
| 2013/0129162 A1* | 5/2013 | Cheng .................... G06F 21/32 |
| | | 382/124 |
| 2013/0181949 A1 | 7/2013 | Setlak |
| 2013/0314105 A1 | 11/2013 | Setlak et al. |
| 2014/0047706 A1 | 2/2014 | Shaikh et al. |
| 2014/0341446 A1* | 11/2014 | Hare .................... G06F 3/0416 |
| | | 382/124 |

FOREIGN PATENT DOCUMENTS

| | | |
|---|---|---|
| TW | 2012-35880 | 9/2012 |
| TW | 2013-37783 | 9/2013 |
| TW | M464687 | 11/2013 |
| TW | M501595 | 5/2015 |

OTHER PUBLICATIONS

103145359, Apr. 21, 2016, Taiwanese 2$^{nd}$ office action with English Summary.

\* cited by examiner

ELECTRONIC APPARATUS WITH FINGERPRINT SENSING FUNCTION, DRIVING CIRCUIT, AND METHOD FOR DRIVING ELECTRONIC APPARATUS WITH FINGERPRINT SENSING FUNCTION

CROSS REFERENCES OF RELATED APPLICATION

The present application claims the priority to Chinese Patent Application No. 201410196102.5, entitled "ELECTRONIC APPARATUS WITH FINGERPRINT SENSING FUNCTION, DRIVING CIRCUIT, AND METHOD FOR DRIVING ELECTRONIC APPARATUS WITH FINGERPRINT SENSING FUNCTION", filed on May 9, 2014 with the State Intellectual Property Office of People's Republic of China, which is incorporated herein by reference in its entirety.

FIELD

The disclosure relates to the technical field of electronic apparatus, and in particular to an electronic apparatus with fingerprint sensing function, a driving circuit, and a method for driving the electronic apparatus with fingerprint sensing function.

BACKGROUND

With increasing development of science and technology, an electronic display device is not only used for displaying multimedia data, but also used for wireless communication, data storage, etc., and various applications are installed therein. For information security of electronic apparatus, encryption needs to be performed on the electronic apparatus, and corresponding decryption needs to be performed on the electronic apparatus for usage.

A conventional way for encryption is to set a digital startup password for the electronic display device. Digital password verification is performed upon power-on or screen unlocking of the electronic apparatus to ensure the information security of the electronic apparatus. However, the digital password can be easily stolen or cracked, which results in a low security for the usage of the electronic apparatus.

SUMMARY

An electronic apparatus with fingerprint sensing function, a driving circuit applied in the electronic apparatus, and a method for driving the electronic apparatus are provided in the present disclosure, to improve the security in using the electronic apparatus.

Technical solutions provided in the disclosure are described as follows.

An electronic apparatus with fingerprint sensing function is provided, the electronic apparatus includes:

a first fingerprint sensor configured to perform a fingerprint detection;

a second fingerprint sensor configured to perform a fingerprint detection; and a driving circuit, where the driving circuit is configured to provide a first fingerprint detection signal to the first fingerprint sensor for performing a fingerprint detection, and determine whether to control the electronic apparatus to perform a first function, based on fingerprint detection information from the first fingerprint sensor; and the driving circuit is further configured to provide a second fingerprint detection signal to the second fingerprint sensor for performing a fingerprint detection, and determine whether to control the electronic apparatus to perform a second function, based on fingerprint detection information from the second fingerprint sensor.

Preferably, the first function may be different from the second function.

Preferably, the first function may include a turning-on and a screen-unlocking of the electronic apparatus, and the second function may include an execution of a predetermined target application.

Preferably, the first fingerprint sensor may be identical with or different from the second fingerprint sensor.

Preferably, if at least one of the first fingerprint sensor and the second fingerprint sensor is a self-capacitive fingerprint sensor, the self-capacitive fingerprint sensor includes a plurality of fingerprint sensing electrodes, and the driving circuit senses a fingerprint by detecting self-capacitances of the fingerprint sensing electrodes.

Preferably, the electronic apparatus may include a display device, the display device includes a plurality of display pixels, each display pixel includes a first display electrode, a second display electrode and a display medium therebetween, where the display apparatus provides corresponding voltages to the first display electrodes and the second display electrodes to control the display media to display a corresponding image, the display pixels form a display region, and at least one of the first fingerprint sensor and the second fingerprint sensor is disposed in the display region.

Preferably, the first display electrodes of a part of the display pixels are further used as the first fingerprint sensor or/and the second fingerprint sensor disposed in the display region.

Preferably, the display device may be an in-plane switching liquid crystal display device or a fringe field switching liquid crystal display device, the first display electrodes may be pixel electrodes, and the second display electrodes may be common electrodes.

Preferably, the display device further includes a border region, the first fingerprint sensor is disposed in the border region, and the second fingerprint sensor is disposed in the display region.

Preferably, the first fingerprint sensor and the second fingerprint sensor may be disposed on the same side of the electronic apparatus.

Preferably, the electronic apparatus may further include a control button disposed in the border region, and the first fingerprint sensor may be disposed under the control button.

Preferably, the driving circuit includes a first triggering circuit configured to receive a triggering signal for turning-on and a triggering signal for screen-unlocking, and the driving circuit provides the first fingerprint detection signal to the first fingerprint sensor if the first triggering circuit receives the triggering signal for turning-on or the triggering signal for screen-unlocking.

Preferably, the driving circuit includes a second triggering circuit configured to receive a triggering signal for the predetermined target application, and the driving circuit provides the second fingerprint detection signal to the second fingerprint sensor if the second triggering circuit receives the triggering signal for the predetermined target application.

Preferably, at least one of the first fingerprint sensor and the second fingerprint sensor includes a plurality of fingerprint detection elements each occupying a separate region of the electronic apparatus;

the driving circuit simultaneously provides a corresponding fingerprint detection signal to the fingerprint detection elements, to control the fingerprint detection elements to perform fingerprint detections simultaneously, or the driving circuit sequentially provides fingerprint detection signals to the fingerprint detection elements at a predetermined interval, to control the fingerprint detection elements to perform fingerprint detections respectively; and the driving circuit compares fingerprint detection information from the fingerprint detection elements with preset fingerprint password information, and determines whether a corresponding function is to be performed, based on a comparison.

Preferably, the driving circuit provides a fingerprint detection signal to at least one of the first fingerprint sensor and the second fingerprint sensor, compares obtained fingerprint detection information with preset fingerprint information, and determines whether a corresponding function is to be performed, based on a comparison; or
the driving circuit provides fingerprint detection signals to at least one of the first fingerprint sensor and the second fingerprint sensor at a predetermined interval to obtain a plurality of pieces of fingerprint detection information, compares the successively obtained fingerprint detection information with preset fingerprint password information, and determines whether a corresponding function is to be performed, based on a comparison.

A driving circuit applied in an electronic apparatus with fingerprint sensing function is further provided in the present disclosure, where the electronic apparatus includes a first fingerprint sensor configured to perform a fingerprint detection and a second fingerprint sensor configured to perform a fingerprint detection; and the driving circuit includes:

a first fingerprint detection circuit, configured to provide a first fingerprint detection signal to the first fingerprint sensor, where the first fingerprint sensor performs a fingerprint detection based on the first fingerprint detection signal;

a second fingerprint detection circuit, configured to provide a second fingerprint detection signal to the second fingerprint sensor, where the second fingerprint sensor performs a fingerprint detection based on the second fingerprint detection signal; and a control circuit configured to determine whether to control the electronic apparatus to perform a first function, based on fingerprint detection information from the first fingerprint sensor, and determine whether to control the electronic apparatus to perform a second function, based on fingerprint detection information from the second fingerprint sensor.

Preferably, the first function may be different from the second function.

Preferably, the first function may include a turning-on and a screen-unlocking of the electronic apparatus, and the second function may include an execution of a predetermined target application.

Preferably, the first fingerprint detection circuit is further configured to receive fingerprint detection information from the first fingerprint sensor and output the fingerprint detection information to the control circuit, and the control circuit determines whether to control the electronic apparatus to perform the first function, based on the fingerprint detection information. The second fingerprint detection circuit is further configured to receive fingerprint detection information from the second fingerprint sensor and output the fingerprint detection information to the control circuit, and the control circuit determines whether to control the electronic apparatus to perform the second function, based on the fingerprint detection information.

Preferably, the driving circuit may further include a first triggering circuit. The first triggering circuit controls the first fingerprint detection circuit to communicate with the first fingerprint sensor, if the first triggering circuit receives a triggering signal for turning-on or a triggering signal for screen-unlocking, and the first fingerprint detection circuit provides the first fingerprint detection signal to the first fingerprint sensor.

Preferably, the driving circuit may further include a second triggering circuit. The second triggering circuit controls the second fingerprint detection circuit to communicate with the second fingerprint sensor, if the second triggering circuit receives a triggering signal for a predetermined target application, and the second fingerprint detection circuit provides the second fingerprint detection signal to the second fingerprint sensor.

A method for driving an electronic apparatus with fingerprint sensing function is further provided in the present disclosure, where the electronic apparatus includes a first fingerprint sensor configured to perform a fingerprint detection and a second fingerprint sensor configured to perform a fingerprint detection; and the method includes:

providing a first fingerprint detection signal to the first fingerprint sensor;

driving the first fingerprint sensor to perform a fingerprint detection, based on the first fingerprint detection signal;

determining whether to control the electronic apparatus to perform a first function, based on fingerprint detection information from the first fingerprint sensor; and providing a second fingerprint detection signal to the second fingerprint sensor;

driving the second fingerprint sensor to perform a fingerprint detection, based on the second fingerprint detection signal; and determining whether to control the electronic apparatus to perform a second function, based on fingerprint detection information from the second fingerprint sensor.

Preferably, the first fingerprint detection signal is provided to the first fingerprint sensor if a triggering signal for turning-on or a triggering signal for screen-unlocking is received.

Preferably, the second fingerprint detection signal is provided to the second fingerprint sensor if a triggering signal for a predetermined target application is received.

The electronic apparatus with fingerprint sensing function in the present disclosure is provided with the first fingerprint sensor and the second fingerprint sensor. The driving circuit provides corresponding fingerprint detection signals to the first fingerprint sensor and the second fingerprint sensor. The first fingerprint sensor and the second fingerprint sensor perform fingerprint detections based on the fingerprint detection signals. The driving circuit determines whether to control the electronic apparatus to perform a corresponding function, based on fingerprint detection information from the first fingerprint sensor and the second fingerprint sensor. It can be seen that the electronic apparatus performs the corresponding function based on fingerprint detection information, that is, the fingerprint detection information is taken as a password for executing the corresponding function, which leads to higher security for usage of the electronic apparatus than using a digital password. A driving circuit for the electronic apparatus and a method for driving the electronic apparatus are further provided in the present disclosure, to securely start a set function of the electronic apparatus.

Furthermore, with the electronic apparatus, the driving circuit and the method provided in the present disclosure, the first function may be performed by touching the first fingerprint sensor, and the second function may be rapidly performed by touching the second fingerprint sensor, while it is unnecessary to search for touch buttons or icons corresponding to the first function and the second function, thereby improving the operation efficiency.

BRIEF DESCRIPTION OF THE DRAWINGS

To illustrate technical solutions according to embodiments of the present disclosure more clearly, drawings to be used in description of the embodiments are described briefly hereinafter. Apparently, the drawings described hereinafter are only for some embodiments of the present disclosure, and other drawings may be obtained by those skilled in the art based on those drawings without creative efforts.

DETAILED DESCRIPTION OF THE EMBODIMENTS

Technical solutions in embodiments of the present disclosure may be described clearly and completely hereinafter in conjunction with drawings in the embodiments of the present disclosure. Apparently, the described embodiments are only a part of but not all of the embodiments of the present disclosure. Any other embodiments obtained by those skilled in the art without creative effort on the basis of the embodiments of the present disclosure should fall within the scope of protection of the present disclosure.

A First Embodiment

As described in the background, the conventional electronic apparatus is encrypted by setting a digital password, while the digital password can be easily stolen or cracked, which results in a low security for the usage of the electronic apparatus. In the present disclosure, an electronic apparatus is provided with a first fingerprint sensor, a second fingerprint sensor and a driving circuit. The driving circuit provides corresponding fingerprint detection signals to the first fingerprint sensor and the second fingerprint sensor. The first fingerprint sensor and the second fingerprint sensor perform fingerprint detections based on the fingerprint detection signals, and output corresponding fingerprint detection information. The driving circuit determines whether to control the electronic apparatus to perform a corresponding function, based on the fingerprint detection information from the first fingerprint sensor and the second fingerprint sensor.

Figure 1:
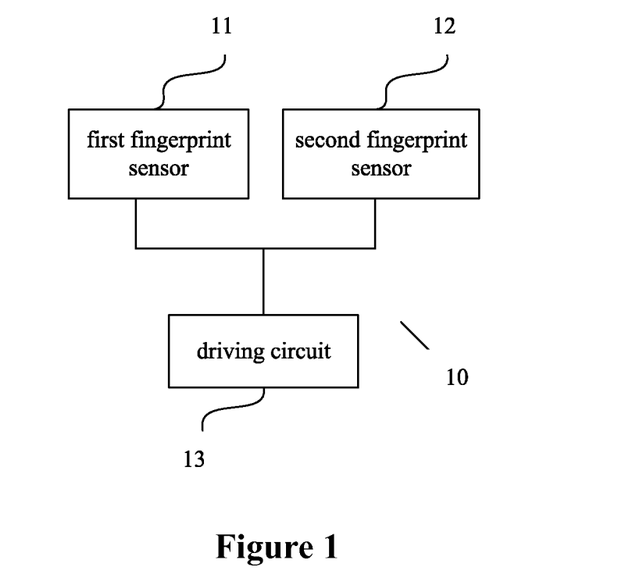
FIG. 1 is a structural block diagram of an electronic apparatus with fingerprint sensing function according to an embodiment of the present disclosure.

In view of the above, an electronic apparatus 10 with fingerprint sensing function is provided according to the embodiment. As shown in FIG. 1, the electronic apparatus 10 includes a first fingerprint sensor 11, a second fingerprint sensor 12, and a driving circuit 13. The first fingerprint sensor 11 and the second fingerprint sensor 12 are connected to the driving circuit 13.

The first fingerprint sensor 11 is for performing a fingerprint sensing function. The second fingerprint sensor 12 is for performing a fingerprint sensing function.

The driving circuit 13 provides a first fingerprint detection signal to the first fingerprint sensor 11. The first fingerprint sensor 11 performs the fingerprint sensing function based on the first fingerprint detection signal. The driving circuit 13 further determines whether to control the electronic apparatus 10 to perform a first function, based on fingerprint detection information from the first fingerprint sensor 11. The fingerprint detection information from the first fingerprint sensor 11 may be compared with first preset referential fingerprint information. If the fingerprint detection information from the first fingerprint sensor 11 matches the first preset referential fingerprint information, the first function is performed. If the fingerprint detection information from the first fingerprint sensor 11 does not match the first preset referential fingerprint information, the first function is not performed.

The driving circuit 13 further provides a second fingerprint detection signal to the second fingerprint sensor 12. The second fingerprint sensor 12 performs the fingerprint sensing function based on the second fingerprint detection signal. The driving circuit 13 determines whether to control the electronic apparatus 10 to perform a second function, based on fingerprint detection information from the second fingerprint sensor 12. The fingerprint detection information from the second fingerprint sensor 12 may be compared with second preset referential fingerprint information. If the fingerprint detection information from the second fingerprint sensor 12 matches the second preset referential fingerprint information, the second function is performed. If the fingerprint detection information from the second fingerprint sensor 12 does not match the second preset referential fingerprint information, the second function is not performed.

The driving circuit 13 determines whether to control the electronic apparatus 10 to perform a corresponding function, based on the fingerprint detection information from the first fingerprint sensor and the second fingerprint sensor, which ensures higher security than starting a set function of the electronic apparatus 10 by means of digital password. In addition, fingerprint may be input through a touch, which leads to higher operation efficiency than typing the digital password character by character.

The first function may be same as the second function. In this way, the electronic apparatus may be controlled to perform a set function if a touch with correct fingerprint information is performed on any of the first fingerprint sensor 11 and the second fingerprint sensor 12.

Alternatively, the first function may be different from the second function. In this way, the electronic apparatus may be controlled to perform the first function if a touch with correct fingerprint information is performed on the first fingerprint sensor 11, and the electronic apparatus may be controlled to perform the second function if a touch with correct fingerprint information is performed on the second fingerprint sensor 12. The electronic apparatus 10 may start two different functions quickly and securely.

If the first function is different from the second function, the first function may be set to include turning-on and screen-unlocking of the electronic apparatus 10, and the turning-on and screen-unlocking of the electronic apparatus 10 may be respectively achieved quickly and securely by touching the first fingerprint sensor 11. The second function may be set to include execution of a predetermined target application, and the predetermined target application of the electronic apparatus 10 may be started quickly and securely by touching the second fingerprint sensor 12. If the electronic apparatus is in a power-off state and the first fingerprint sensor 11 is triggered, the driving circuit 13 determines whether to control the electronic apparatus 10 to perform a turning-on operation, based on the fingerprint detection information from the first fingerprint sensor 11. If the electronic apparatus 10 is in a power-on state and the first fingerprint sensor 11 is triggered, the driving circuit 13 determines whether to control the electronic apparatus 10 to perform a screen-unlocking operation from a screen-locking state, based on the fingerprint detection information from the first fingerprint sensor 11.

The second function may include the execution of the predetermined target application installed in the electronic apparatus 10, such as a browser, a variety of games, a page navigation, a third-party payment client, or the like. A page navigation may include a page turning, a page down, a page up, a page left, and a page right for an image, a webpage, or an e-book, etc.

For an application which does not need encryption, if the application is set to be associated with the second fingerprint sensor 12, the driving circuit 13 may control the electronic apparatus 10 to execute the application, either when the second fingerprint sensor 12 is touched with a correct fingerprint input or when an icon corresponding to the application is touched.

For an application which needs encryption, if the application is set to be associated with the second fingerprint sensor 12, the driving circuit 13 may control the electronic apparatus 10 to execute the application only if the fingerprint detection information from the fingerprint sensor 12 is correct. If the fingerprint detection information from the fingerprint sensor 12 is incorrect, the application can not be started even when an icon corresponding to the application is touched. Here, an operator may touch the second fingerprint sensor 12 based on a prompt provided by the electronic apparatus, to perform a fingerprint verification. The prompt may be a voice prompt or a text prompt.

For example, the second function is a third-party payment, and the electronic apparatus 10 is a mobile phone. If a user of the mobile phone wants to make a payment with a third-party payment client, the user may touch the second fingerprint sensor 12 with a correct fingerprint to start the third-party payment client. Preferably, if an icon corresponding to the third-party payment client is touched, a voice prompt or a text prompt may be provided by the mobile phone to inform the user of the mobile phone to perform fingerprint verification through the second fingerprint sensor 12.

If the first function includes the turning-on and the screen-unlocking of the electronic apparatus 10, and the second function is the execution of the predetermined target application, approaches for implementing fingerprint detection performed by the electronic apparatus 10 when the operator touches the first fingerprint sensor 11 or the second fingerprint sensor 12 are described as follows. In a first implementation, the driving circuit 13 continuously provides the first fingerprint detection signal to the first fingerprint sensor 11, and at the same time, continuously provides the second fingerprint detection signal to the second fingerprint sensor 12.

Figure 2:
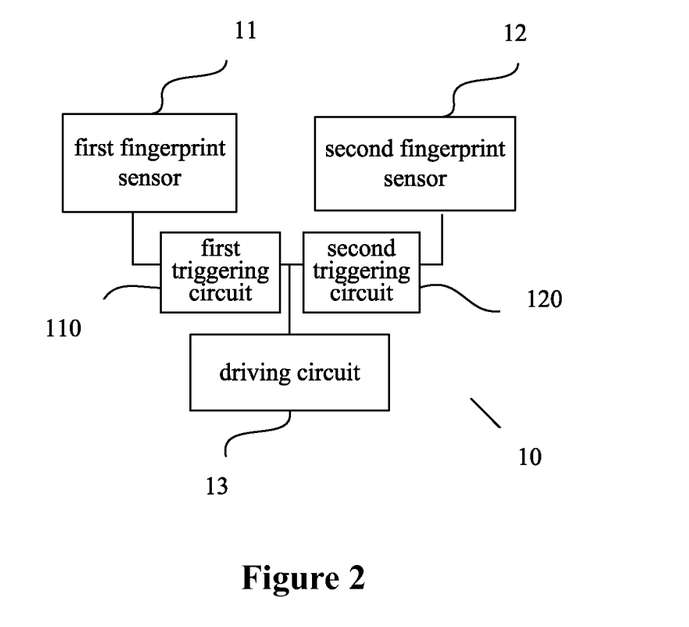
FIG. 2 is a structural block diagram of an electronic apparatus with fingerprint sensing function according to another embodiment of the present disclosure.

A second implementation is described herein in conjunction with FIG. 2. As shown in FIG. 2, the driving circuit 13 includes a first triggering circuit 110 for receiving a triggering signal for turning-on and a triggering signal for screen-unlocking, and the driving circuit 13 provides the first fingerprint detection signal to the first fingerprint sensor 11 when the triggering signal for turning-on or the triggering signal for screen-unlocking is received by the first triggering circuit 110.

In the second implementation, the driving circuit 13 further includes a second triggering circuit 120 for receiving a triggering signal for the predetermined target application, and the driving circuit 13 provides the second fingerprint detection signal to the second fingerprint sensor 12 when the triggering signal for the predetermined target application is received by the second triggering circuit 120. If a touch button or an icon corresponding to the predetermined target application is touched, the triggering signal for the predetermined target application may be received by the second triggering circuit 120, and the driving circuit 13 provides the second fingerprint detection signal to the second fingerprint sensor 12, based on feedback information from the second triggering circuit. In this case, the fingerprint detection may be implemented through the fingerprint sensor 12 once the second fingerprint sensor 12 is touched, and only if the fingerprint detection information from the second fingerprint sensor 12 is correct, the driving circuit 13 controls the electronic apparatus 10 to start and execute the predetermined target application.

In the second implementation, a fingerprint detection signal is provided to a corresponding fingerprint sensor by the driving circuit 13 only when a corresponding triggering circuit is triggered, thereby reducing the energy consumption. And the driving circuit does not need to perform a determination when no fingerprint input is provided to any of the fingerprint sensors, thereby improving the determination efficiency of the driving circuit.

The first fingerprint sensor 11 may be same as the second fingerprint sensor 12. Both of the first fingerprint sensor 11 and the second fingerprint sensor 12 may be self-capacitive fingerprint sensors, for example. Each of the self-capacitive fingerprint sensors performs a self-capacitance detection based on a self-capacitive fingerprint detection signal provided by the driving circuit 13, to implement fingerprint detection. Or both of the first fingerprint sensor 11 and the second fingerprint sensor 12 are mutual-capacitive fingerprint sensors, for example. Each of the mutual-capacitive fingerprint sensors performs a mutual-capacitance detection based on a mutual-capacitive fingerprint detection signal provided by the driving circuit 13, to implement fingerprint detection.

Figure 3:
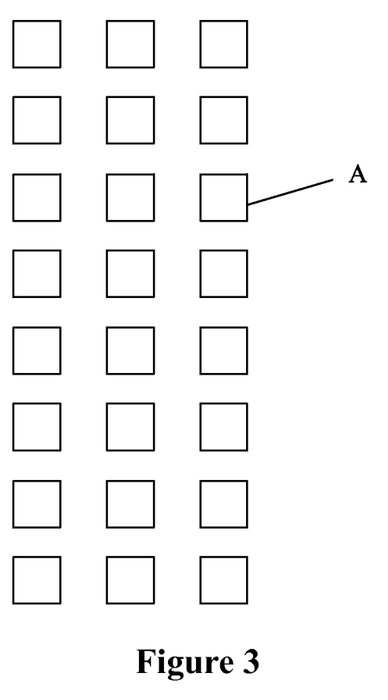
FIG. 3 is a schematic structural diagram of a self-capacitive fingerprint sensor according to an embodiment of the present disclosure.

If at least one of the first fingerprint sensor 11 and the second fingerprint sensor 12 is the self-capacitive fingerprint sensor, the self-capacitive fingerprint sensor includes multiple fingerprint sensing electrodes A, as shown in FIG. 3.

The multiple fingerprint sensing electrodes A are arranged in a two-dimensional array in the embodiment, but are not limited to the two-dimensional array. Correspondingly, the self-capacitance detection is to detect capacitances of capacitors formed by a touch object and the respective fingerprint sensing electrodes. The touch object may be a finger, or a stylus, for example. The fingerprint sensing electrodes A and the touch object respectively serve as first plates and second plates of the formed capacitors. The first fingerprint sensor 11 may be different from the second fingerprint sensor 12. One of the first fingerprint sensor 11 and the second fingerprint sensor 12 may be the self-capacitive fingerprint sensor, and the other may be the mutual-capacitive fingerprint sensor. The self-capacitive fingerprint sensor performs the self-capacitance detection based on the self-capacitive fingerprint detection signal provided by the driving circuit, to implement fingerprint detection, and the mutual-capacitive fingerprint sensor performs the mutual-capacitance detection based on the mutual-capacitive fingerprint detection signal provided by the driving circuit, to implement fingerprint detection.

Figure 4:
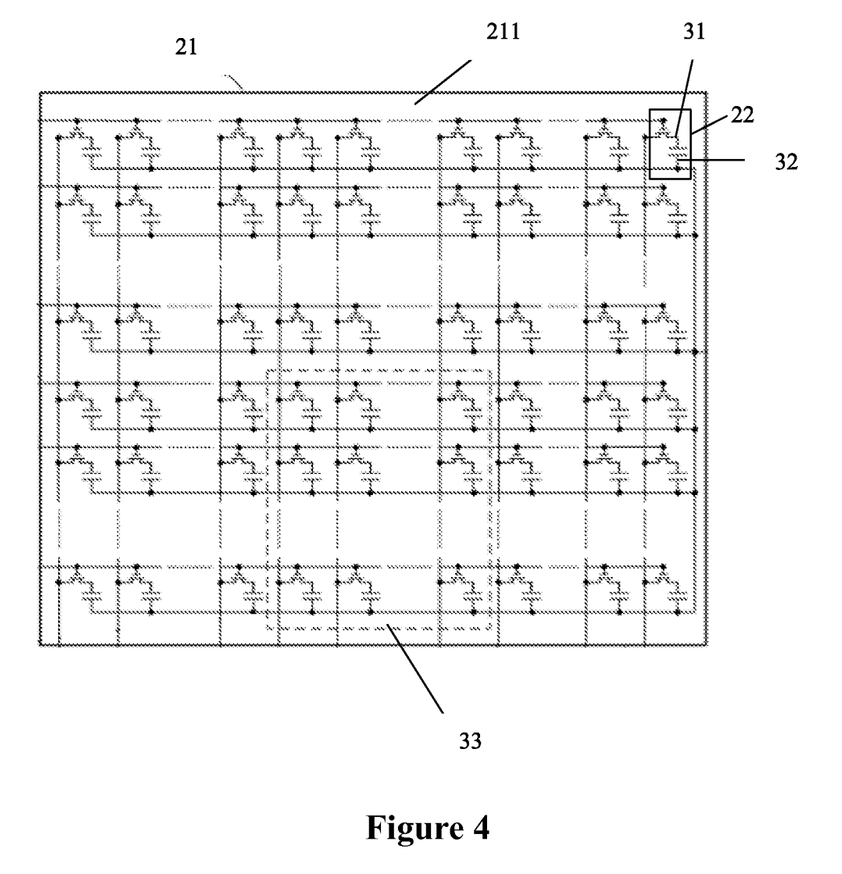
FIG. 4 is a schematic structural diagram of a display device of an electronic apparatus with fingerprint sensing function according to an embodiment of the present disclosure.

The electronic apparatus 10 in the embodiment further includes a display device 21. As shown in FIG. 4, the display device 21 includes a plurality of display pixels 22, and each display pixel 22 includes a first display electrode 31, a second display electrode 32 and a display medium (not shown in FIG. 4) located therebetween. The electronic apparatus 10 supplies corresponding voltages to the first display electrodes 31 and the second display electrodes 32, to drive the display media to display a corresponding image. The display pixels 22 define a display region 211. At least one of the first fingerprint sensor 11 and the second fingerprint sensor 12 is disposed in the display region 211. To reduce the fabrication cost of the electronic apparatus 10, the first display electrodes 31 of the display pixels 22 within a preset region 33 are further used as the fingerprint sensor(s) disposed in the display region 211, and the preset region 33 is a fingerprint sensing region. When the display pixels 22 within the preset region 33 need to display an image, the driving circuit 13 provides a corresponding driving signal for image display to the display pixels 22 within the preset region 33. When the fingerprint detection needs to be performed, the driving circuit 13 provides a corresponding fingerprint detection signal to the first display electrodes 31 of the display pixels 22 within the preset region 33.

Figure 5:
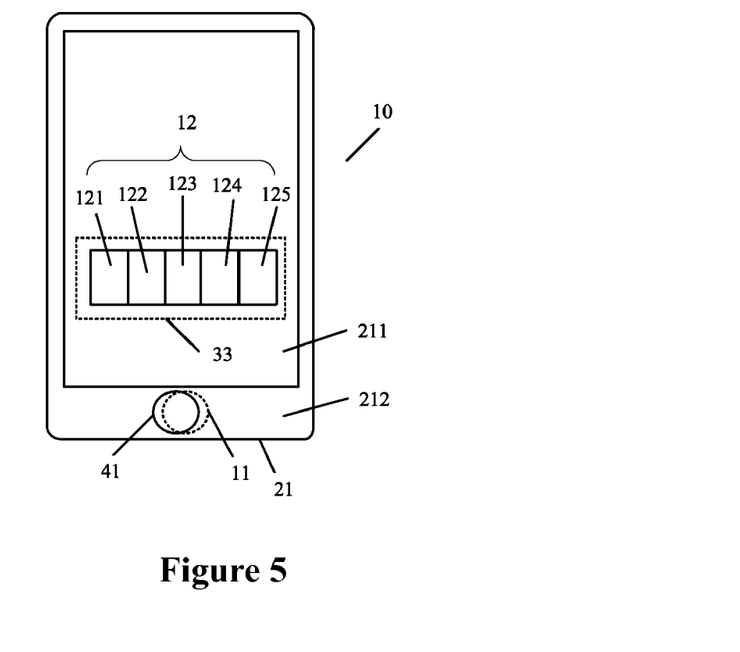
FIG. 5 is a schematic structural diagram of an electronic apparatus with fingerprint sensing function according to an embodiment of the present disclosure.

The display device 21 may be an in-plane switching (IPS) liquid crystal display device, or a fringe field switching (FFS) liquid crystal display device, for example. The first display electrodes 31 are pixel electrodes, the second display electrodes 32 are common electrodes, and the display media are liquid crystal molecules. The self-capacitive detection signal is provided to the pixel electrodes by the driving circuit 13, and the pixel electrodes perform the self-capacitance detection to implement fingerprint recognition. As shown in FIG. 5, in the electronic apparatus 10, the display device 21 further includes a border region 212, where the first fingerprint sensor 11 is disposed in the border region 212, and the second fingerprint sensor 12 is disposed in the display region 211. The first function is set as the turning-on and the screen-unlocking of the electronic apparatus, the first fingerprint sensor 11 is disposed in the border region 212 and is located under a control button 41 to improve operating efficiency. The second function is set as the execution of the target application, the second fingerprint sensor 12 is disposed in the preset region 33 within the display region 211 to reduce the fabrication cost. In other embodiments, the first fingerprint sensor 11 and the second fingerprint sensor 12 may be both disposed in the display region 211.

The first fingerprint sensor 11 and the second fingerprint sensor 12 may be disposed on the same side of the electronic apparatus 10. The electronic apparatus 10 includes the display region 211 and the border region 212 surrounding the display region. The first fingerprint sensor 11 is disposed in the border region 212 and the second fingerprint sensor 12 is disposed in the preset region 33 within the display region 211, for facilitating touch operations on the first fingerprint sensor 11 and the second fingerprint sensor 12.

At least one of the first fingerprint sensor 11 and the second fingerprint sensor 12 includes a plurality of fingerprint detection elements. Each of the fingerprint detection elements occupies a separate region of the electronic apparatus 10, and each separate region is one fingerprint detection region.

In the fingerprint detection, the driving circuit 13 may simultaneously provides corresponding fingerprint detection signals to the fingerprint detection elements, to control the fingerprint detection elements to perform fingerprint detections simultaneously. Alternatively, the driving circuit 13 sequentially provides fingerprint detection signals to the fingerprint detection elements at a predetermined interval, to control the fingerprint detection elements to perform fingerprint detections separately. The driving circuit 13 compares the fingerprint detection information from the fingerprint detection elements with preset fingerprint password information and determines whether a corresponding function of the electronic apparatus 10 is to be performed, based on a comparison.

As shown in FIG. 5, the electronic apparatus 10 further includes a control button 41 for turning-on and screen-unlocking of the electronic apparatus 10. For example, if the electronic apparatus 10 is a mobile phone, the control button 41 is a Home button. The first fingerprint sensor 11 may be disposed under the control button 41. When the control button 41 is triggered, a triggering signal for turning-on or a triggering signal for screen-unlocking may be received by the first triggering circuit 110. The driving circuit 13 provides the first fingerprint detection signal to the first fingerprint sensor 11 based on feedback information from the first triggering circuit 110, to drive the first fingerprint sensor 11 to perform the fingerprint detection. Here, a touch operation which may trigger the control button 41 may be used to input the triggering signal for turning-on or the triggering signal for screen-unlocking, and may also be used to input a fingerprint for starting the first function, thereby improving the operating efficiency. In other embodiments, the first fingerprint sensor 11 may be disposed in other positions.

The second fingerprint sensor 12 is disposed in the display region 211, and the first fingerprint sensor 11 is disposed in the border region 212. The second fingerprint sensor 12 includes a first fingerprint detection element 121, a second fingerprint detection element 122, a third fingerprint detection element 123, a fourth fingerprint detection element 124, and a fifth fingerprint detection element 125.

According to the above described approach, the second fingerprint sensor 12 shown in FIG. 5 may perform fingerprint detection through the five fingerprint detection elements 121, 122, 123, 124, and 125, the five fingerprint detection elements 121, 122, 123, 124, and 125 may operate simultaneously, or the five fingerprint detection elements 121, 122, 123, 124, and 125 may successively perform fingerprint detections. Authorized fingerprint information set for the five fingerprint detection elements 121, 122, 123, 124, and 125 may be identical or non-identical. That is, five fingerprint passwords set for the five fingerprint detection elements 121, 122, 123, 124, and 125 may be an identical fingerprint or may be five non-identical fingerprints.

In the fingerprint detection, the driving circuit 13 provides a fingerprint detection signal to at least one of the first fingerprint sensor 11 and the second fingerprint sensor 12, compares obtained fingerprint information with preset fingerprint information, and determines whether a corresponding function of the electronic apparatus 10 is to be performed, based on a comparison. Or the driving circuit 13 provides the fingerprint detection signal at a predetermined interval, compares the fingerprint information successively obtained at respective intervals with predetermined fingerprint information, and determines whether a corresponding function of the electronic apparatus 10 is to be performed, based on comparisons. In this approach, at least one of the first fingerprint sensor 11 and the second fingerprint sensor 12 includes one fingerprint detection element and corresponds to one fingerprint detection region. For example, the first fingerprint sensor 11 in FIG. 5 may only recognize one fingerprint in each time of detection. Accordingly, when using the first fingerprint sensor 11 to perform a fingerprint sensing function, one fingerprint password may be set and only one time of fingerprint detection is performed. The driving circuit 13 compares a sensing result with the predetermined fingerprint information to determine whether a corresponding function is to be performed. Alternatively, the fingerprint password set for the first fingerprint sensor 11 may be a sequence of fingerprints. In this case, the driving circuit 13 provides fingerprint detection signals to the first fingerprint sensor 11 at a predetermined interval, and compares a sensing result with the sequence of fingerprints to determine whether a corresponding function is to be performed.

A Second Embodiment

Figure 6:
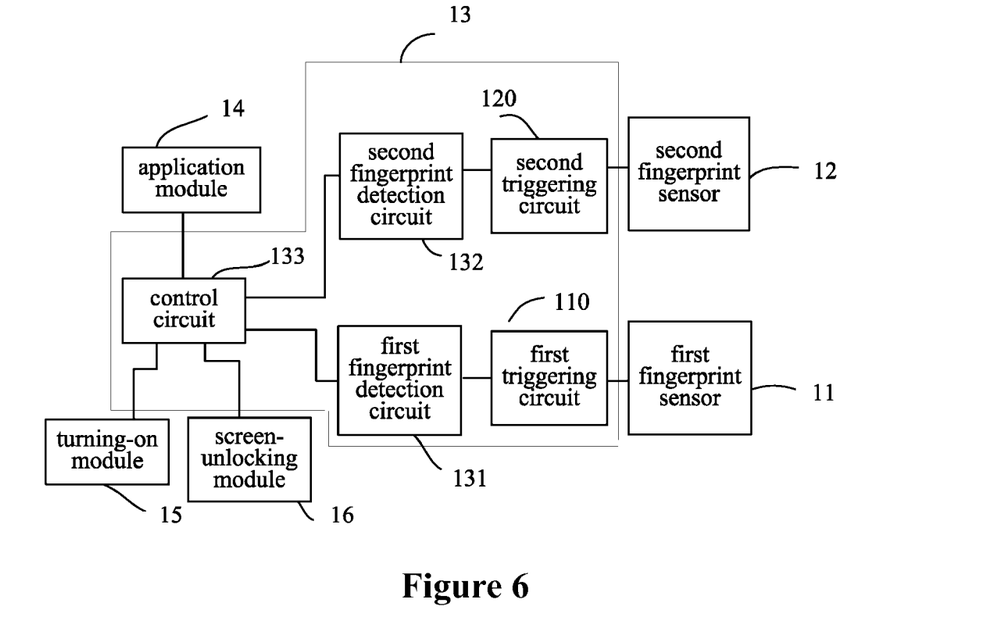
FIG. 6 is a structural block diagram of an electronic apparatus with fingerprint sensing function according to an embodiment of the present disclosure.

As shown in FIG. 6, an electronic apparatus 10 with fingerprint sensing function is provided according to the embodiment. Same as the first embodiment, the electronic apparatus 10 according to the embodiment includes a driving circuit 13, a first fingerprint sensor 11 for performing a fingerprint detection, and a second fingerprint sensor 12 for performing a fingerprint detection.

The driving circuit 13 includes: a first fingerprint detection circuit 131, a second fingerprint detection circuit 132, and a control circuit 133. The control circuit 133 is connected to the first fingerprint sensor 11 via the first fingerprint detection circuit 131, and is connected to the second fingerprint sensor 12 via the second fingerprint detection circuit 132.

The first fingerprint detection circuit 131 provides a first fingerprint detection signal to the first fingerprint sensor 11, to drive the first fingerprint sensor 11 to perform a fingerprint detection. The second fingerprint detection circuit 132 provides a second fingerprint detection signal to the second fingerprint sensor 12, to drive the second fingerprint sensor 12 to perform a fingerprint detection. The control circuit 133 determines whether to control the electronic apparatus 10 to perform a first function, based on fingerprint detection information from the first fingerprint sensor 11, and the control circuit 133 determines whether to control the electronic apparatus to perform a second function, based on fingerprint detection information from the second fingerprint sensor 12.

The first fingerprint detection circuit 131 further receives the fingerprint detection information from the first fingerprint sensor 11, and outputs the fingerprint detection information to the control circuit 133. The control circuit 133 determines whether to control the electronic apparatus 10 to perform the first function, based on the fingerprint detection information. The second fingerprint detection circuit 132 further receives the fingerprint detection information from the second fingerprint sensor 12, and outputs the fingerprint detection information to the control circuit. The control circuit 133 determines whether to control the electronic apparatus 10 to perform the second function, based on the fingerprint detection information.

The driving circuit 13 further includes a first triggering circuit 110 and a second triggering circuit 120. The first triggering circuit 110 controls the first fingerprint detection circuit 131 to communicate with the first fingerprint sensor 11, if the first triggering circuit 110 receives a triggering signal for turning-on or a triggering signal for screen-unlocking, and the first fingerprint detection circuit 131 provides the first fingerprint detection signal to the first fingerprint sensor 11. The second triggering circuit 120 controls the second fingerprint detection circuit 132 to communicate with the second fingerprint sensor 12, if the second triggering circuit 120 receives a triggering signal for a predetermined target application, and the second fingerprint detection circuit 132 provides the second fingerprint detection signal to the second fingerprint sensor 12. The first triggering circuit 110 is connected between the first fingerprint detection circuit 131 and the first fingerprint sensor 11, and the second triggering circuit 120 is connected between the second fingerprint detection circuit 132 and the second fingerprint sensor 12.

The electronic apparatus 10 further includes an application module 14, a turning-on module 15 and a screen-unlocking module 16. The application module 14, the turning-on module 15, and the screen-unlocking module 16 are connected to the control circuit 13. The application module 14 is for executing a predetermined target application. The turning-on module is for turning on the electronic apparatus 10. The screen-unlocking module 16 is for unlocking a display screen of the electronic apparatus 10. In this case, the first function may be set to include turning-on and screen-unlocking, and the second function may be set as execution of the predetermined target application. The control circuit 133 controls the application module 14 to enter an operating status only if the fingerprint detection information from the first fingerprint sensor 11 matches first predetermined fingerprint information, and the application module 14 may start the predetermined target application in response to the triggering signal for the predetermined target application; while the predetermined target application is not to be started if the fingerprint detection information from the first fingerprint sensor 11 does not match the first predetermined fingerprint information.

The control circuit 133 controls the turning-on module 15 to enter an operating status only if the fingerprint detection information from the second fingerprint sensor 12 matches second predetermined fingerprint information, and the turning-on module 15 may perform a turning-on operation in response to the triggering signal for turning-on; or the control circuit 133 controls the screen-unlocking module 16 to enter an operating status only if the fingerprint detection information from the second fingerprint sensor 12 matches second predetermined fingerprint information, and the screen-unlocking module 16 may perform a screen-unlocking operation in response to the triggering signal for screen-unlocking. None of the turning-on operation and the screen-unlocking is to be performed if the fingerprint detection information from the second fingerprint sensor 12 does not match the second predetermined fingerprint information.

In the embodiment, the setting of the first function and the second function is not limited to what disclosed herein. The first function and the second function may be same or may be different. Detailed setting of the first function and the second function may be referred to the description in the first embodiment, which is not repeated herein.

The driving circuit 13 according to the embodiment may determine whether to control the electronic apparatus 10 to perform the first function and the second function, based on the fingerprint detection information, which leads to high security and high operating efficiency.

A Third Embodiment

Figure 7:
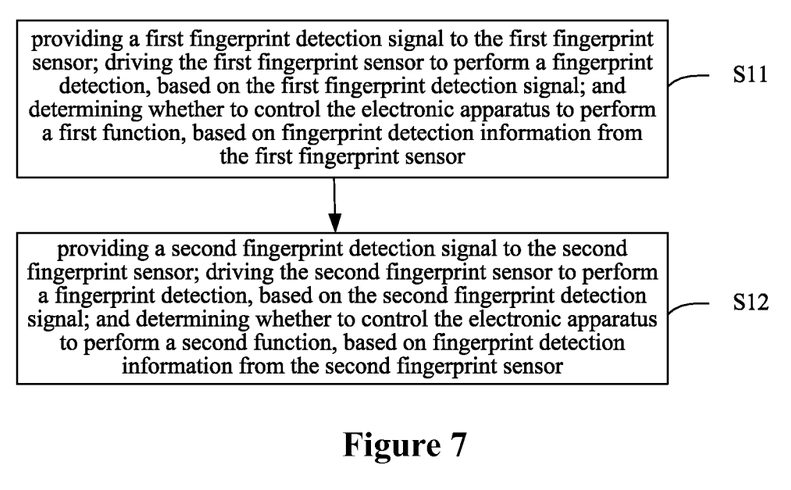
FIG. 7 is a schematic flowchart of a method for driving an electronic apparatus with fingerprint sensing function according to an embodiment of the present disclosure.

A method for driving the foregoing electronic apparatus 10 with fingerprint detection function is provided according to the embodiment. As shown in FIG. 7, the method is described as follows.

In step S11, a first fingerprint detection signal is provided to the first fingerprint sensor, the first fingerprint sensor is driven to perform a fingerprint detection, and it is determined whether the electronic apparatus is to be controlled to perform a first function, based on fingerprint detection information from the first fingerprint sensor.

In step S12, a second fingerprint detection signal is provided to the second fingerprint sensor, the second fingerprint sensor is driven to perform a fingerprint detection, and it is determined whether the electronic apparatus is to be controlled to perform a second function, based on fingerprint detection information from the second fingerprint sensor.

It should be noted that, the embodiment is only one implementation. Practically, when driving the electronic apparatus 10 to perform fingerprint detection, the step S12 may be performed before the step S11. The sequence for performing the step S11 and S12 is determined based on actual touch operations. If the first fingerprint sensor is triggered first, the step S11 is performed first. If the second fingerprint sensor is triggered first, the step S12 is performed first.

In the embodiment, the first fingerprint detection signal is provided to the first fingerprint sensor if the triggering signal for turning-on or the triggering signal for screen-unlocking is received. The second fingerprint detection signal is provided to the second fingerprint sensor if the triggering signal for the predetermined target application is received. In other embodiments, the first fingerprint sensor may be continuously provided with the first fingerprint detection signal, and the second fingerprint sensor may be continuously provided with the second fingerprint detection signal. Detailed implementation may be referred to the description in the above embodiments, which is not repeated herein.

In the method according to the embodiment, it may be determined whether to control the electronic apparatus to perform the first function and the second function, based on the fingerprint detection information, thereby leading to high security and high operating efficiency.

With the above descriptions of the disclosed embodiments, those skilled in the art may implement or use the present disclosure. Various modifications made to those embodiments are obvious to those skilled in the art, and general principles of the present disclosure can be implemented in other embodiments without departing from the spirit or the scope of the present disclosure. Therefore, the present disclosure is not limited to those embodiments disclosed herein, but should claim a widest scope in accordance with the principles and the novel characteristics disclosed in the specification.

The invention claimed is:

1. An electronic apparatus with fingerprint sensing function, comprising:
    a first fingerprint sensor configured to perform a fingerprint detection;
    a second fingerprint sensor configured to perform a fingerprint detection; and
    a driving circuit configured to provide a first fingerprint detection signal to the first fingerprint sensor for performing a fingerprint detection, and determine whether to control the electronic apparatus to perform a first function, based on fingerprint detection information from the first fingerprint sensor; and the driving circuit further configured to provide a second fingerprint detection signal to the second fingerprint sensor for performing a fingerprint detection, and determine whether to control the electronic apparatus to perform a second function, based on fingerprint detection information from the second fingerprint sensor,
    wherein the electronic apparatus comprises a display device, the display device comprises a plurality of display pixels, each display pixel comprises a first display electrode, a second display electrode and a display medium therebetween, wherein the display apparatus provides voltages to the first display electrodes and the second display electrodes to control the display media to display an image, the plurality of display pixels form a display region, and at least one of the first fingerprint sensor and the second fingerprint sensor is disposed in the display region.

2. The electronic apparatus with fingerprint sensing function according to claim 1, wherein the first function is different from the second function.

3. The electronic apparatus with fingerprint sensing function according to claim 1, wherein
    the first function comprises a turning-on and a screen-unlocking of the electronic apparatus, and
    the second function comprises an execution of a predetermined target application.

4. The electronic apparatus with fingerprint sensing function according to claim 1, wherein the first fingerprint sensor is identical with or different from the second fingerprint sensor.

5. The electronic apparatus with fingerprint sensing function according to claim 1, wherein if at least one of the first fingerprint sensor and the second fingerprint sensor is a self-capacitive fingerprint sensor, the self-capacitive fingerprint sensor comprises a plurality of fingerprint sensing electrodes, and the driving circuit senses a fingerprint by detecting self-capacitances of the plurality of fingerprint sensing electrodes.

6. The electronic apparatus with fingerprint sensing function according to claim 1, wherein the first display electrodes of a part of the plurality of display pixels are further used as the first fingerprint sensor or/and the second fingerprint sensor disposed in the display region.

7. The electronic apparatus with fingerprint sensing function according to claim 6, wherein the display device is an in-plane switching liquid crystal display device or a fringe field switching liquid crystal display device, the first display electrodes are pixel electrodes, and the second display electrodes are common electrodes.

8. The electronic apparatus with fingerprint sensing function according to claim 6, wherein the display device further comprises a border region, the first fingerprint sensor is disposed in the border region, and the second fingerprint sensor is disposed in the display region.

9. The electronic apparatus with fingerprint sensing function according to claim 8, wherein the first fingerprint sensor and the second fingerprint sensor are disposed on the same side of the electronic apparatus.

10. The electronic apparatus with fingerprint sensing function according to claim 9, further comprising:
a control button disposed in the border region, wherein the first fingerprint sensor is disposed under the control button.

11. The electronic apparatus with fingerprint sensing function according to claim 3, wherein the driving circuit comprises a first triggering circuit configured to receive a triggering signal for turning-on and a triggering signal for screen-unlocking, and the driving circuit provides the first fingerprint detection signal to the first fingerprint sensor if the first triggering circuit receives the triggering signal for turning-on or the triggering signal for screen-unlocking.

12. The electronic apparatus with fingerprint sensing function according to claim 3, wherein the driving circuit comprises a second triggering circuit configured to receive a triggering signal for the predetermined target application, and the driving circuit provides the second fingerprint detection signal to the second fingerprint sensor if the second triggering circuit receives the triggering signal for the predetermined target application.

13. The electronic apparatus with fingerprint sensing function according to claim 1, wherein at least one of the first fingerprint sensor and the second fingerprint sensor comprises a plurality of fingerprint detection elements each occupying a separate region of the electronic apparatus;
the driving circuit simultaneously provides a corresponding fingerprint detection signal to the plurality of fingerprint detection elements, to control the plurality of fingerprint detection elements to perform fingerprint detections simultaneously, or the driving circuit sequentially provides fingerprint detection signals to the plurality of fingerprint detection elements at a predetermined interval, to control the fingerprint detection elements to perform fingerprint detections respectively; and
the driving circuit compares fingerprint detection information from the plurality of fingerprint detection elements with preset fingerprint password information, and determines whether a corresponding function is to be performed, based on a comparison.

14. The electronic apparatus with fingerprint sensing function according to claim 1, wherein the driving circuit provides a fingerprint detection signal to at least one of the first fingerprint sensor and the second fingerprint sensor, compares obtained fingerprint detection information with preset fingerprint information, and determines whether a corresponding function is to be performed, based on a comparison; or
the driving circuit provides fingerprint detection signals to at least one of the first fingerprint sensor and the second fingerprint sensor at a predetermined interval to obtain a plurality of pieces of fingerprint detection information, compares the successively obtained fingerprint detection information with preset fingerprint password information, and determines whether a corresponding function is to be performed, based on a comparison.

15. A driving circuit applied in an electronic apparatus with fingerprint sensing function, wherein the electronic apparatus comprises a first fingerprint sensor configured to perform a fingerprint detection and a second fingerprint sensor configured to perform a fingerprint detection, and wherein the electronic apparatus further comprises a display device, the display device comprises a plurality of display pixels, each display pixel comprises a first display electrode, a second display electrode and a display medium therebetween, the display apparatus provides voltages to the first display electrodes and the second display electrodes to control the display media to display an image, the plurality of display pixels form a display region, and at least one of the first fingerprint sensor and the second fingerprint sensor is disposed in the display region; and
the driving circuit comprises:
a first fingerprint detection circuit configured to provide a first fingerprint detection signal to the first fingerprint sensor, wherein the first fingerprint sensor performs a fingerprint detection based on the first fingerprint detection signal;
a second fingerprint detection circuit configured to provide a second fingerprint detection signal to the second fingerprint sensor, wherein the second fingerprint sensor performs a fingerprint detection based on the second fingerprint detection signal; and
a control circuit configured to determine whether to control the electronic apparatus to perform a first function, based on fingerprint detection information from the first fingerprint sensor, and determine whether to control the electronic apparatus to perform a second function, based on fingerprint detection information from the second fingerprint sensor.

16. The driving circuit according to claim 15, wherein the first function is different from the second function.

17. The driving circuit according to claim 15, wherein
the first function comprises a turning-on and a screen-unlocking of the electronic apparatus, and
the second function comprises an execution of a predetermined target application.

18. The driving circuit according to claim 15, wherein
the first fingerprint detection circuit is further configured to receive fingerprint detection information from the first fingerprint sensor and output the fingerprint detection information to the control circuit, and the control circuit determines whether to control the electronic apparatus to perform the first function, based on the fingerprint detection information; and
the second fingerprint detection circuit is further configured to receive fingerprint detection information from the second fingerprint sensor and output the fingerprint detection information to the control circuit, and the control circuit determines whether to control the electronic apparatus to perform the second function, based on the fingerprint detection information.

19. The driving circuit according to claim 15, further comprising:
a first triggering circuit, wherein the first triggering circuit controls the first fingerprint detection circuit to communicate with the first fingerprint sensor, if the first triggering circuit receives a triggering signal for turning-on or a triggering signal for screen-unlocking, and the first fingerprint detection circuit provides the first fingerprint detection signal to the first fingerprint sensor.

20. The driving circuit according to claim 15, further comprising:
a second triggering circuit, wherein the second triggering circuit controls the second fingerprint detection circuit to communicate with the second fingerprint sensor, if the second triggering circuit receives a triggering signal for a predetermined target application, and the second fingerprint detection circuit provides the second fingerprint detection signal to the second fingerprint sensor.

21. A method for driving an electronic apparatus with fingerprint sensing function, wherein the electronic apparatus comprises a first fingerprint sensor configured to perform a fingerprint detection and a second fingerprint sensor configured to perform a fingerprint detection and wherein the electronic apparatus further comprises a display device, the display device comprises a plurality of display pixels, each display pixel comprises a first display electrode, a second display electrode and a display medium therebetween, the display apparatus provides voltages to the first display electrodes and the second display electrodes to control the display media to display an image, the plurality of display pixels form a display region, and at least one of the first fingerprint sensor and the second fingerprint sensor is disposed in the display region; and the method comprises:

provided a first fingerprint detection signal to the first fingerprint sensor;

driving the first fingerprint sensor to perform a fingerprint detection, based on the first fingerprint detection signal;

determining whether to control the electronic apparatus to perform a first function, based on fingerprint detection information from the first fingerprint sensor; and providing a second fingerprint detection signal to the second fingerprint sensor;

driving the second fingerprint sensor to perform a fingerprint detection, based on the second fingerprint detection signal; and determining whether to control the electronic apparatus to perform a second function, based on fingerprint detection information from the second fingerprint sensor.

22. The method according to claim 21, wherein the first fingerprint detection signal is provided to the first fingerprint sensor if a triggering signal for turning-on or a triggering signal for screen-unlocking is received.

23. The method according to claim 21, wherein the second fingerprint detection signal is provided to the second fingerprint sensor if a triggering signal for a predetermined target application is received.

* * * * *